(12) United States Patent
Shuai et al.

(10) Patent No.: US 10,835,871 B2
(45) Date of Patent: Nov. 17, 2020

(54) WATER PURIFIER AND WATER PREPARATION METHOD THEREOF

(71) Applicant: A.O. SMITH (CHINA) WATER HEATER CO., LTD., Nanjing (CN)

(72) Inventors: Shi Shuai, Nanjing (CN); Haifeng Zhang, Nanjing (CN); Zhaoshan Cheng, Nanjing (CN); Yaohua He, Nanjing (CN)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 16/204,957

(22) Filed: Nov. 29, 2018

(65) Prior Publication Data
US 2019/0168164 A1    Jun. 6, 2019

Related U.S. Application Data

(63) Continuation of application No. PCT/CN2017/084809, filed on May 18, 2017.

(51) Int. Cl.
*B01D 65/02* (2006.01)
*B01D 61/02* (2006.01)
(Continued)

(52) U.S. Cl.
CPC ............. *B01D 65/02* (2013.01); *B01D 39/18* (2013.01); *B01D 39/2055* (2013.01);
(Continued)

(58) Field of Classification Search
None
See application file for complete search history.

(56) References Cited

U.S. PATENT DOCUMENTS 4,776,952 A * 10/1988 Burrows ................ B01D 61/12
   210/110
5,503,735 A *  4/1996 Vinas ..................... B01D 61/12
   210/87
(Continued)

FOREIGN PATENT DOCUMENTS

CN    103041704 A    4/2013
CN    202945107 U    5/2013
(Continued)

OTHER PUBLICATIONS

Chinese Patent Office Action for Application No. 201610374874.2 dated Jul. 2, 2019 (10 pages, English translation included).
(Continued)

*Primary Examiner* — Richard C Gurtowski
(74) *Attorney, Agent, or Firm* — Michael Best & Friedrich LLP

(57) ABSTRACT

The present invention discloses a water purifier and a water production method thereof, relating to the technical field of water processing, the water purifier comprising: a reverse osmosis membrane device comprising a raw water port, a purified water port and a waste water port; a water storage device which is provided therein with a first chamber of which a volume can be adjusted, the first chamber being communicated with the raw water port and the purified water port, respectively; in the cleaning mode, the first chamber is disconnected from the purified water port, the first chamber is communicated with the raw water port, and the purified water flows into the first chamber from the raw water port of the reverse osmosis membrane device and is discharged from the waste water port of the reverse osmosis membrane device; in the water production mode, and the first chamber is communicated with the purified water port, the first chamber is disconnected from the raw water port. In the present invention, the purified water is stored in the
(Continued)

water purifier so as to flush the reverse osmosis membrane device, such that the total dissolved solid (TDS) of a first glass of purified water that flows out of the water purifier at the beginning of use is reduced, and meanwhile lifetime of a reverse osmosis membrane in the reverse osmosis membrane device is effectively improved.

23 Claims, 4 Drawing Sheets

(51) Int. Cl.
B01D 39/20 (2006.01)
B01D 39/18 (2006.01)
B01D 61/08 (2006.01)
B01D 61/12 (2006.01)
C02F 9/00 (2006.01)
C02F 1/00 (2006.01)
C02F 1/28 (2006.01)
C02F 1/44 (2006.01)

(52) U.S. Cl.
CPC .......... B01D 61/02 (2013.01); B01D 61/025 (2013.01); B01D 61/08 (2013.01); B01D 61/12 (2013.01); C02F 9/00 (2013.01); B01D 2311/2626 (2013.01); B01D 2311/2649 (2013.01); B01D 2313/243 (2013.01); B01D 2313/50 (2013.01); B01D 2315/10 (2013.01); B01D 2321/12 (2013.01); C02F 1/001 (2013.01); C02F 1/008 (2013.01); C02F 1/283 (2013.01); C02F 1/441 (2013.01); C02F 2303/16 (2013.01)

(56) References Cited

U.S. PATENT DOCUMENTS

2005/0072724 A1* 4/2005 Nakayama ............ B01D 61/16
 210/280
2005/0139530 A1* 6/2005 Heiss ........................ C02F 9/00
 210/85

FOREIGN PATENT DOCUMENTS

| CN | 103183419 A | 7/2013 |
| CN | 203820555 U | 9/2014 |
| CN | 104591341 A | 5/2015 |
| CN | 104817198 A | 8/2015 |
| CN | 205821019 U | 12/2016 |
| CN | 106277391 A | 1/2017 |
| CN | 106345306 A | 1/2017 |

OTHER PUBLICATIONS

Chinese Patent Office Action and Search Report for Application No. 201610374874.2 dated Jan. 23, 2019 (26 pages, English translation included).

International Search Report and Written Opinion for Application No. PCT/CN2017/084809 dated Aug. 3, 2017 (19 pages, English translation included).

* cited by examiner

WATER PURIFIER AND WATER PREPARATION METHOD THEREOF

CROSS-REFERENCE TO RELATED APPLICATIONS

The present application claims the priority of the Chinese patent application for invention No. 201610374874.2, entitled "Water Purifier and Water Production method thereof", filed on May 31, 2016, of which the entire contents are incorporated by reference in the present application.

TECHNICAL FIELD

The present invention relates to the technical field of water processing, and in particular to a water purifier and a water production method thereof.

BACKGROUND

For the existing water purifier, especially a non-bucket water purifier of large flow, during the use of such water purifier, a reverse osmosis membrane device is used for filtering raw water that flows thereinto from a raw water port, the purified water flows out of a purified water port, and waste water is discharged from a waste water port. When the water purifier is not used, the concentrated waste water is remained all the time at a waste water side of a reverse osmosis membrane that plays the role of filtering in the reverse osmosis membrane device, and after the time reaches a certain level, salt or other dissolved solids in the waste water will permeate into the reverse osmosis membrane to reach a purified water side of the reverse osmosis membrane. As such, when the water purifier is used again, the total dissolved solid (TDS) of a first cup of purified water that flows out of the water purifier at the beginning of use is somewhat high, which may cause low quality and insufficient purity of this cup of purified water.

SUMMARY

To overcome the above defect in the prior art, the technical problem to be solved by the embodiments of the present invention is to provide a water purifier and a water production method thereof, which can effectively reduce the total dissolved solid (TDS) in the water that flows out when the water purifier is turned on.

The embodiments of the present invention have technical solutions specifically as follows: a water purifier, including a reverse osmosis membrane device comprising a raw water port, a purified water port and a waste water port, a water storage device which is provided therein with a first chamber of which volume can be adjusted, the first chamber can be communicated with the raw water port and the purified water port, respectively, the water purifier has a cleaning mode and a water production mode, in the cleaning mode, the first chamber is disconnected from the purified water port, the first chamber is communicated with the raw water port, the purified water flows into the first chamber from the raw water port of the reverse osmosis membrane device and is discharged from the waste water port of the reverse osmosis membrane device, in the water production mode, the first chamber is communicated with the purified water port, and the first chamber is disconnected from the raw water port.

Preferably, the water storage device comprises a separator which separates interior of the water storage device into the first chamber and a second chamber that are isolated from each other, and can adjust sizes of the first chamber and the second chamber.

Preferably, a first switching device is disposed between the first chamber and the raw water port, and a second switching device is disposed between the first chamber and the purified water port.

Preferably, gas or liquid can flow into the second chamber.

Preferably, the second chamber can be in communication with a water source or a gas source.

Preferably, the water purifier further comprises a pre-filter element whose outlet can be in communication with the second chamber.

Preferably, the water purifier comprises a first control switch disposed between the outlet of the pre-filter element and the second chamber, in the cleaning mode, the first control switch causes the outlet of the pre-filter element to be in communication with the second chamber, in the water production mode, the first control switch causes the outlet of the pre-filter element to be disconnected from the second chamber.

Preferably, the first chamber is provided therein with filtering material.

Preferably, the filtering material separates the first chamber into a third chamber and a fourth chamber that are arranged along a filtering direction of the filtering material, the third chamber is communicated with the purified water port of the reverse osmosis membrane device, and the fourth chamber is communicated with the raw water port of the reverse osmosis membrane device.

Preferably, the fourth chamber is communicated with a water use end.

Preferably, the filtering material is activated carbon filter element.

Preferably, the separator includes at least one of an airbag piston and a drumhead.

Preferably, the water storage device comprises an elastic member that can adjust the volume of the first chamber.

A water production method of a water purifier, the water purifier comprising: a reverse osmosis membrane device comprising a raw water port, a purified water port and a waste water port; a water storage device which is provided therein with a first chamber of which a volume can be adjusted, the first chamber being communicated with the raw water port and the purified water port, respectively, when the water purifier is in a water production state, communicating the purified water port with the first chamber and disconnecting the raw water port from the first chamber such that purified water flowing out of the reverse osmosis membrane device flows into the first chamber, when the water purifier is in a cleaning state, communicating the raw water port with the first chamber such that the purified water in the first chamber flows into the raw water port of the reverse osmosis membrane device.

The technical solutions of the present invention have the following significant beneficial effects: (1) The water purifier in the embodiments of the present invention is provided with a water storage device; when the water purifier is in the water production mode, the first chamber is communicated with the purified water port, and the first chamber is disconnected from the raw water port; the purified water that flows out of the reverse osmosis membrane device can be inputted to the water storage device, such that the water storage device collects a certain amount of purified water. When the water purifier is out of use, the water purifier is in the cleaning mode; the first chamber is disconnected from the purified water port, and the first chamber is communicated with the raw water port; the water storage device discharges the purified water stored therein to the raw water port of the reverse osmosis membrane device; this part of purified water flushes the reverse osmosis membrane of the reverse osmosis membrane device, such that water at the waste water side of the reverse osmosis membrane is the purified water; in this way, when the water purifier is not used, both sides of the reverse osmosis membrane have the purified water. When the water purifier is used again, the total dissolved solid (TDS) of a first cup of purified water that flows out of the water purifier at the beginning of use will not be somewhat high.

(2) The water storage device stores the purified water to flush the reverse osmosis membrane device, which can effectively improve the life of the reverse osmosis membrane of the reverse osmosis membrane device, and meanwhile, the purified water that flows out of the waste water port of the reverse osmosis membrane device can also flush a wastewater ratio means of the water purifier, so as to improve the life of the wastewater ratio means as well.

(3) The separator of the water purifier in the present invention is an airbag, a drumhead, or a piston, etc.; the purified water stored in the water storage device is pushed into the reverse osmosis membrane device by pressure of gas or pressure of tap water to conduct the flushing; in this way, the water purifier can generate the pressure by which the purified water is pushed into the reverse osmosis membrane device without the need of providing other pressure devices.

Other aspects of the invention will become apparent by consideration of the detailed description and accompanying drawings.

BRIEF DESCRIPTION OF THE DRAWINGS

The accompanying drawings described here are merely for the purpose of explanation, not intended to limit the scope disclosed by the present invention in any way. In addition, shape and proportional dimensions of the components in the drawings are only illustrative for helping understanding to the present invention, not specifically defining the shape and proportional dimensions of the components of the present invention. Being taught by the present invention, persons skilled in the art can implement the present invention by selecting various possible shapes and proportional dimensions depending on the specific circumstances.

Numerical references in the above drawings: 1. reverse osmosis membrane device; 11. purified water port; 12. waste water port; 13. raw water port; 2. water storage device; 21. first chamber; 211. third chamber; 212. fourth chamber; 22. second chamber; 23. separator; 24. elastic member; 31. first switching device; 32. second switching device; 33. first control switch; 34. first solenoid valve; 35. second solenoid valve; 4. wastewater ratio means; 5. booster pump; 6. carbide filter element; 7. PP cotton filter element; 8. pre-filter element; 9. activated carbon filter element; 10. water use end.

DETAILED DESCRIPTION

The accompanying drawings and the description of the detailed embodiments of the present invention can be incorporated to understand the details of the present invention more clearly. However, the detailed embodiments of the present invention described here are only used for the purpose of explaining the present invention, and cannot be understood as limitation to the invention in any way. Being taught by the present invention, persons skilled in the art can conceive any possible modification based on the present invention, which should be regarded as belonging to the scope of the present invention.

Figure 1:
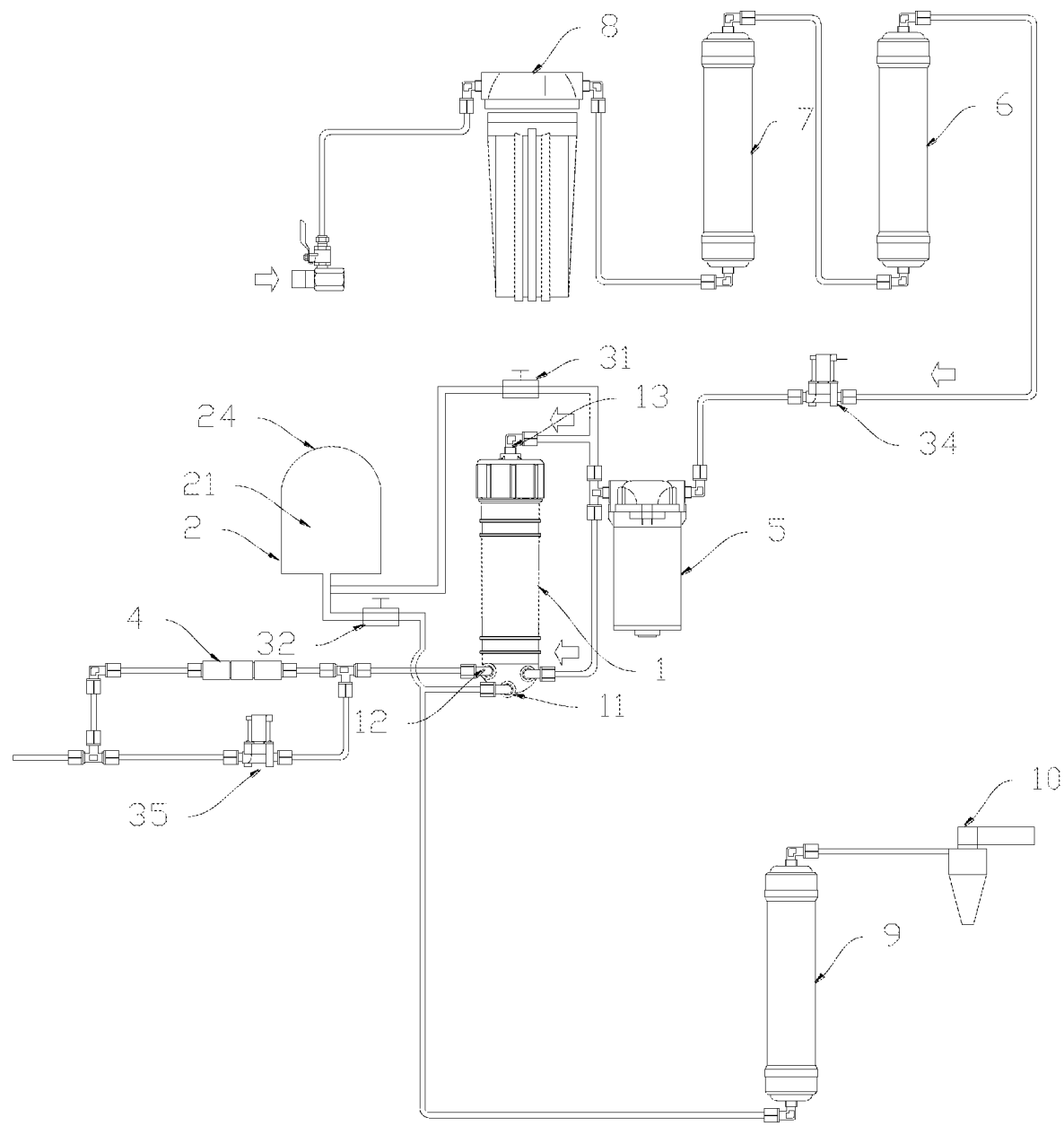
FIG. 1 is a structural schematic of a water purifier in a first embodiment according to the embodiments of the present invention.

FIG. 1 is a structural schematic of a water purifier in a first embodiment according to the embodiments of the present invention. As shown in FIG. 1, the present application provides a water purifier, the water purifier comprising: a reverse osmosis membrane device 1 comprising a raw water port 13, a purified water port 11 and a waste water port 12; a water storage device 2 which is provided therein with a first chamber 21 of which a volume can be adjusted, the first chamber 21 being capable of communicating with the raw water port 13 and the purified water port 11, respectively; the water purifier has a cleaning mode and a water production mode, in the cleaning mode, the first chamber 21 is disconnected from the purified water port 11, and the first chamber 21 is communicated with the raw water port 13, and the purified water flows into the first chamber from the raw water port of the reverse osmosis membrane device and is discharged from the waste water port of the reverse osmosis membrane device; in the water production mode, the first chamber 21 is communicated with the purified water port 11, and the first chamber 21 is disconnected from the raw water port 13.

Figure 4:
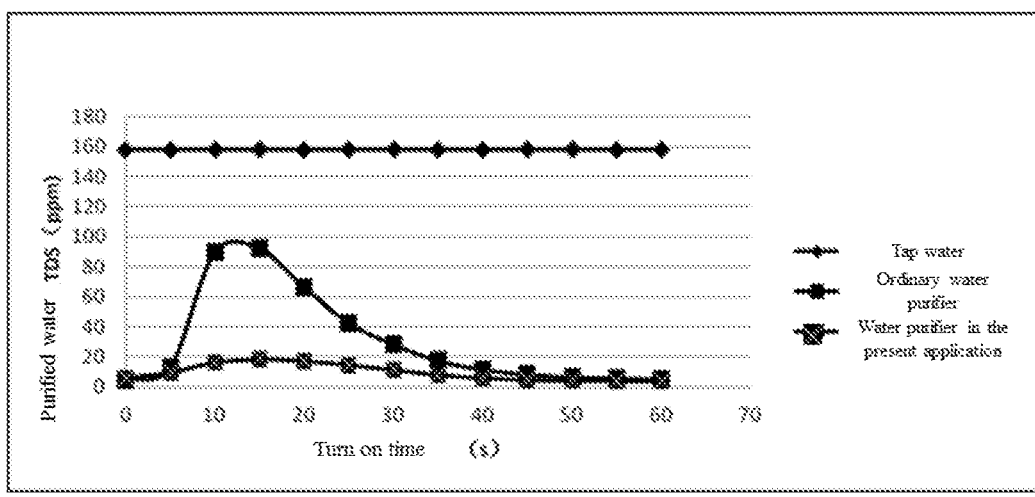
FIG. 4 is a comparison diagram of the total dissolved solid (TDS) of the output water between the water purifier of the present invention and a water purifier without a water storage device after they are turned off for two hours.

When the water purifier is in a daily turned-on state, i.e., the water purifier is in the water production mode, the water that flows thereinto from the raw water port 13 can be filtered by the water purifier to become the purified water, then the purified water flows out of the purified water port 11, and the waste water is discharged from the waste water port 12. In the above water production mode, the first chamber 21 of the water storage device 2 can be communicated with the purified water port 11, and the first chamber 21 can be disconnected from the raw water port 13, in this way, the purified water that flows out of the reverse osmosis membrane device 1 can be inputted to the water storage device 2, such that the water storage device 2 collects a certain amount of purified water. When the water purifier is out of use, the water purifier is in the cleaning mode. At this time, the first chamber 21 of the water storage device 2 can be disconnected from the purified water port 11, and the first chamber 21 can be communicated with the raw water port 13, such that the purified water stored in the water storage device 2 is discharged to the raw water port 13 of the reverse osmosis membrane device 1. This part of purified water flows into the reverse osmosis membrane device 1 from the raw water port 13 of the reverse osmosis membrane device 1, so as to flush the reverse osmosis membrane of the reverse osmosis membrane device 1, so that the waste water at the waste water side of the reverse osmosis membrane is flushed out and then is replaced by the purified water, and the purified water after flushing flows out of the waste water port 12 of the reverse osmosis membrane device 1. In this way, when the water purifier is out of use, both sides of the reverse osmosis membrane are purified water, no matter how much time lasts, the total dissolved solid (TDS) at the purified water side of the reverse osmosis membrane will not increase. Therefore, when the water purifier is used again, the total dissolved solid (TDS) of a first cup of purified water that flows out of the water purifier at the beginning of use is effectively reduced. FIG. 4 is a comparison diagram of the total dissolved solid (TDS) of the output water between the water purifier of the present invention and a water purifier without a water storage device after they are turned off for two hours. As shown in FIG. 4, the total dissolved solid (TDS) of the input tag water (the raw water) is somewhat high, after the water purifier is turned off for two hours, the water purifier is turned on to produce water, and the total dissolved solids (TDS) of the purified water obtained by filtering the raw water by the water purifier is reduced. Within about 30 seconds since water just starts to flow out of the water purifier, the total dissolved solid (TDS) of the purified water that flows out of an ordinary water purifier without a water storage device is much higher than the total dissolved solid (TDS) of the purified water that flows out of the water purifier of the present invention. It can be shown from the comparison experiment that, the water purifier of the present invention effectively reduces the total dissolved solid (TDS) of the purified water that flows out of the water purifier when the water purifier is used again after it is turned off for a period of time.

The water purifier of the present invention is further explained as follows. As shown in FIG. 1, the reverse osmosis membrane device 1 comprises a raw water port 13, a purified water port 11 and a waste water port 12, and is used for filtering the fluid that flows from the raw water port 13; the filtered fluid flows out of the purified water port 11, and the waste water is discharged from the waste water port of the reverse osmosis membrane device 1. A booster pump 5, a first solenoid valve 34, a carbide filter element 6, a PP cotton filter element 7, a pre-filter element 8 and a water inlet ball valve connected to a water source are connected in sequence from the raw water 13 of the reverse osmosis membrane device 1. The PP cotton filter element 7 and the carbide filter element 6 are used for filtering contaminant in the fluid, a particle level of the contaminant filtered here is smaller than a particle level of the contaminant filter by the pre-filter element 8. The first solenoid valve 34 is used for controlling on and off of the pipeline between the carbide filter element and the booster pump 5. The booster pump 5 is used for pressurizing the fluid in the pipeline and transporting it to the raw water port 13 of the reverse osmosis membrane device 1 for ensuring the pressure in the pipeline, such that the reverse osmosis membrane device 1 can filter the fluid in the pipeline under the action of sufficient pressure. Meanwhile, the booster pump 5 can also be a membrane pump. When the booster pump 5 is in the off state, the fluid can flow through the booster pump 5 as well.

The water storage device 2 is provided therein with a first chamber 21 of which a volume can be adjusted, and the first chamber 21 of the water storage device 2 is connected to the raw water port 13 and the purified water port 11 of the reverse osmosis membrane device 1, respectively. The first switching device 31 is disposed between the first chamber 21 and the raw water port 13, and the second switching device 32 is disposed between the first chamber 21 and the purified water port 11. The first switching device 31 and the second switching device 32 are used for controlling communication and disconnection between the first chamber 21 of the water storage device 2 and the raw water port 13 of the reverse osmosis membrane device 1, as well as communication and disconnection between the first chamber 21 of the water storage device 2 and the purified water port 11 of the reverse osmosis membrane device 1. For example, the first switching device 31 and the second switching device 32 can be solenoid valves. In one embodiment, as shown in FIG. 1, the water storage device 2 is provided therein with an elastic member 24 that can adjust the volume of the first chamber 21. The elastic member 24 can be a thin film with strong elasticity, which can be made of, for example, rubber, EPDM rubber, chloroprene rubber, or the like. When the water purifier is in the water production mode, the first chamber 21 is communicated with the purified water port 11, the first chamber 21 is disconnected from the raw water port 13, and the purified water that flows out of the purified water port 11 is pushed into the first chamber 21. At this time, since the separator 23 has strong elasticity, the volume of the first chamber 21 increases. When the purified water in the first chamber reaches a certain degree, the purified water flowing out of the purified water port 11 will not flow into the first chamber 21 anymore. Thereafter, the first chamber 21 can be disconnected from the purified water port 11 by the second switching device 32. When the water purifier is out of use, i.e., it is in the cleaning mode. At this time, the first chamber 21 is disconnected from the purified water port 11 through the first switching device 31 and the second switching device, and the first chamber 21 is communicated with the raw water port 13. Since the separator 23 has strong elasticity, after the first chamber 21 is communicated with the raw water port 13, the purified water stored in the first chamber 21 is pushed out under the action of the elasticity of the separator 23, such that the purified water stored in the first chamber 21 flows into the raw water port 13 of the reverse osmosis membrane device 1, thereby the purified water flushes the reverse osmosis membrane device 1.

Figure 2:
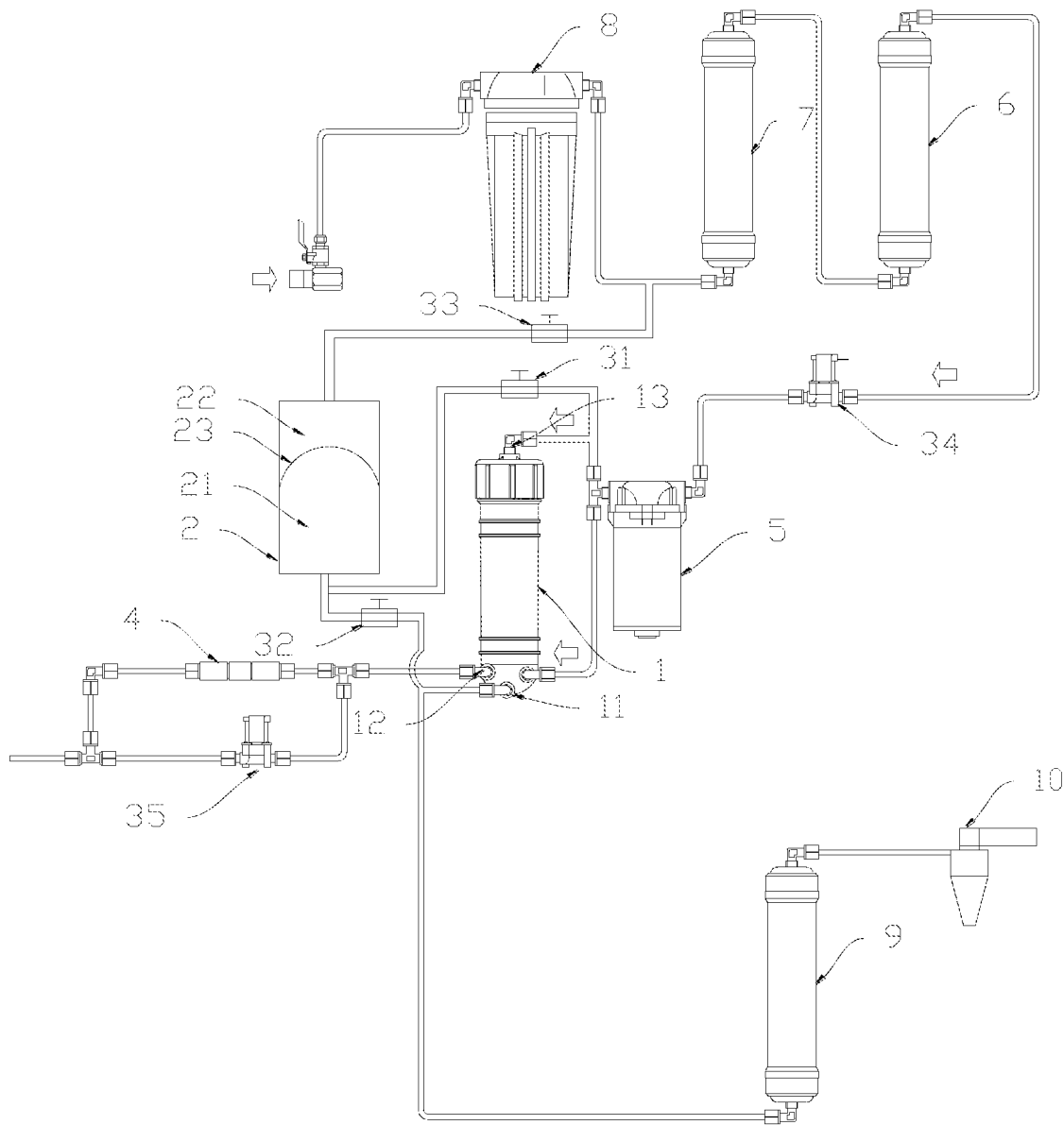
FIG. 2 is a structural schematic of a water purifier in a second first embodiment according to the embodiments of the present invention.

In another embodiment, FIG. 2 is a structural schematic of a water purifier in a second first embodiment according to the embodiments of the present invention. As shown in FIG. 2, the water storage device 2 is provided with a separator 23 which separates interior of the water storage device into the first chamber 21 and the second chamber 22 that are isolated from each other, and the separator 23 can adjust sizes of the first chamber 21 and the second chamber 22. The separator 23 may be a piston, a drumhead or a flexible thin film. In addition, the second chamber 22 can be communicated with a water source or a gas source, such that gas or liquid can flow into the second chamber 22. Wherein, the water source can be tap water, and the gas source can be a gas cylinder having high pressure. In the above structure, especially when the second chamber 22 is communicated with the tap water source, the tap water source provides not only raw water for the water purifier but also pressure satisfying the requirement for the second chamber 22, and such pressure can ensure that the purified water stored in the first chamber 21 is pushed out, so as to flush the reverse osmosis membrane device 1. The first switching device 31 is disposed between the first chamber 21 and the raw water port 13, and the second switching device 32 is disposed between the first chamber 21 and the purified water port 11. The first control switch 33 is disposed between the second chamber 22 and the water source or the gas source. To facilitate the automatic control, the first switching device 21, the second switching device 32 and the first control switch 33 can be solenoid valves. When the water purifier is in the water production mode, the first chamber 21 is communicated with the purified water port 11, the first chamber 21 is disconnected from the raw water port 13, and the purified water that flows out of the purified water port 11 is pushed into the first chamber 21. At this time, since the separator 23 is a piston or a flexible thin film, the volume of the first chamber 21 increases, the volume of the second chamber 22 decreases, thus the first chamber 21 stores a certain amount of purified water. Thereafter, after the purified water stored in the first chamber 21 satisfies the requirement, the first chamber can be disconnected from the purified water port 11 by the second switching device 32. When the water purifier is out of use, i.e., the water purifier is in the cleaning mode, the first chamber 21 is disconnected from the purified water port 11 by the first switching device 31 and the second switching device, and the first chamber 21 is communicated with the raw water port 13. Meanwhile, the first control switch 33 is opened such that the second chamber 22 is communicated with a water source or a gas source. Since gas or liquid in the water source or the gas source is filled into the second chamber 22 and applies a force on the separator 23 to push the separator 23, finally the volume of the second chamber 22 increases and the volume of the first chamber 21 decreases. Since the volume of the first chamber 21 decreases, a part of the purified water in the first chamber 21 is pushed out by the gas source or the water source, and the purified water flows into the raw water port 13 of the reverse osmosis membrane device 1, such that the purified water flushes the reverse osmosis membrane device 1. In this way, when the water purifier is out of use, both sides of the reverse osmosis membrane are purified water. When the water purifier is used again, the total dissolved solid (TDS) of a first cup of purified water that flows out of the water purifier at the beginning of use can be effectively reduced.

In the above embodiment, the second chamber 22 can be not communicated with a water source or a gas source. For example, when the separator 23 is a piston, an elastic member, e.g., a spring, can be disposed in the second chamber 22. When the water purifier is in the water production mode, the first chamber 21 is communicated with the purified water port 11, the first chamber 21 is disconnected from the raw water port 13, and the purified water that flows out of the purified water port 11 is pushed into the first chamber 21. At this time, the spring in the second chamber 22 contracts, the piston slides, the volume of the second chamber 22 decreases, and the volume of the first chamber 21 increases to store the inflow purified water. When the water purifier is out of use, i.e., the water purifier is in the cleaning mode, the first chamber 21 is disconnected from the purified water port 11 by the first switching device 31 and the second switching device, and the first chamber 21 is communicated with the raw water port 13. At this time, the spring in the second chamber 22 pushes the piston to slide, the volume of the second chamber 22 increases, the volume of the first chamber decreases to push the purified water stored therein out, and under the action of the spring, the purified water flows into the raw water port of the reverse osmosis membrane device 1 to conduct the flushing. In this embodiment, the second chamber 22 can also be communicated with an outlet of the pre-filter element 8. The water purifier comprises the first control switch 33 that is disposed between the outlet of the pre-filter element 8 and the second chamber 22; in the cleaning mode, the first control switch 33 causes the outlet of the pre-filter element 8 to be in communication with the second chamber 22; in the water production mode, the first control switch 33 causes the outlet of the pre-filter element 8 to be disconnected from the second chamber 22. When the water purifier is used, i.e., the water purifier is in the water production mode, the second control switch is closed. When the water purifier is out of use, i.e., the water purifier is in the cleaning mode, the first control switch 33 is opened, the tap water is filtered by the pre-filter element 8 and then flows into the second chamber 22. Under the pressure of the tap water, a force is applied on the separator 23 to push the separator 23, such that the volume of the second chamber 22 increases and the volume of the first chamber 21 decreases. In this way, a part of the purified water in the first chamber 21 is pushed out by the gas source or the water source, and flows into the raw water port 13 of the reverse osmosis membrane device 1, such that the purified water flushes the reverse osmosis membrane device 1.

Figure 3:
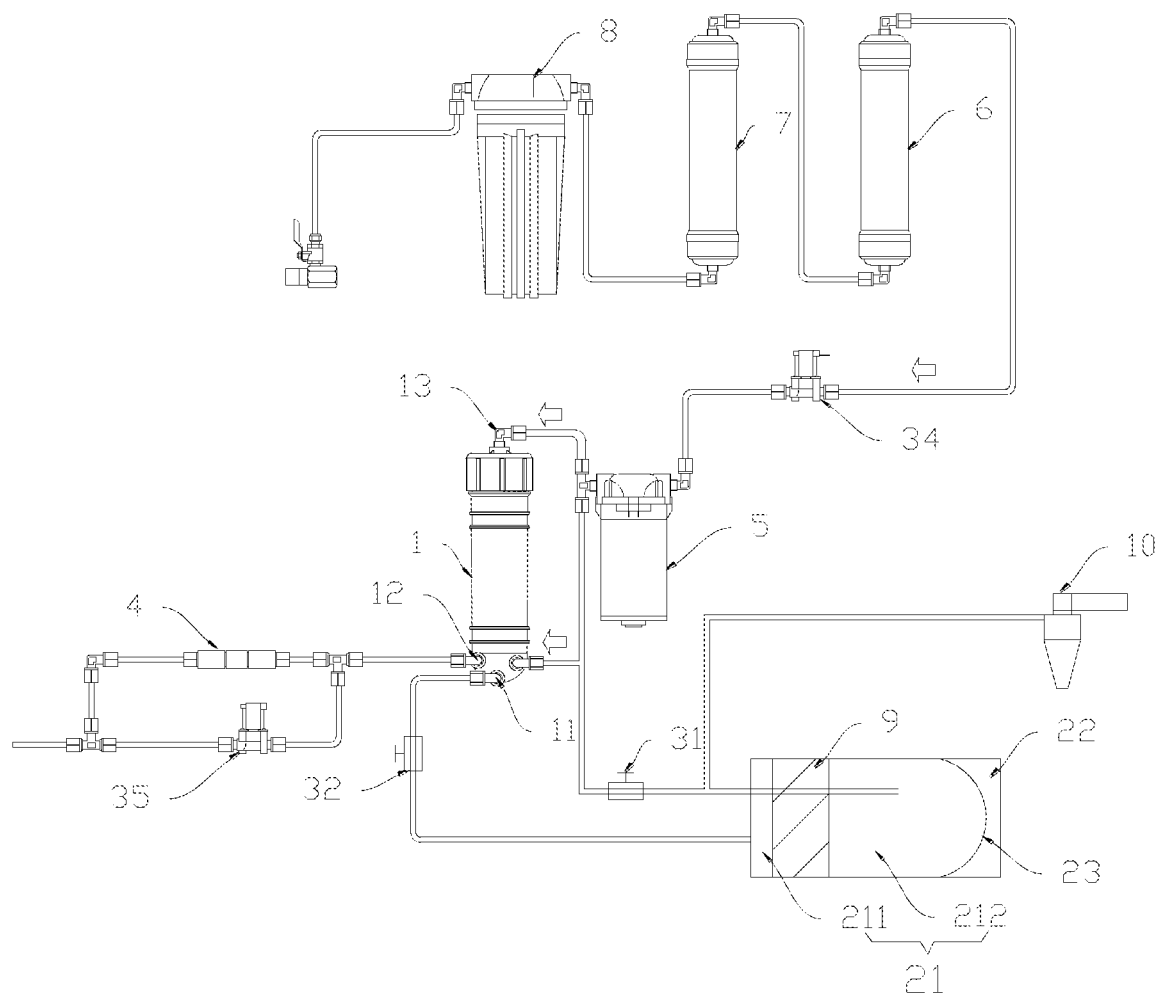
FIG. 3 is a structural schematic of a water purifier in a third first embodiment according to the embodiments of the present invention.

In another embodiment, FIG. 3 is a structural schematic of a water purifier in a third first embodiment according to the embodiments of the present invention. As shown in FIG. 3, the water storage device 2 is provided with a separator 23 which separates interior of the water storage device into the first chamber 21 and the second chamber 22 that are isolated from each other, and the separator 23 can adjust sizes of the first chamber 21 and the second chamber 22. The separator 23 can be an airbag, the interior of which is the second chamber 22. The first chamber 21 can be communicated with the raw water port 13 and the purified water port 11, respectively. The first switching device 31 is disposed between the first chamber 21 and the raw water port 13, and the second switching device 32 is disposed between the first chamber 21 and the purified water port 11. In the water production mode of the water purifier, the first chamber 21 is communicated with the purified water port 11, the first chamber 21 is disconnected from the raw water port 13, the purified water that flows out of the purified water port 11 of the reverse osmosis membrane device 1 flows into the first chamber 21 of the water storage device 2. Since the purified water flowing out of the purified water port has certain pressure, at this time, the airbag is pressurized and shrinks. In the water production mode, the first chamber 21 is communicated with the purified water port 11, and the first chamber 21 is disconnected from the raw water port 13. Under the pressure of the gas inside the airbag, the airbag expands to push out the purified water in the first chamber 21, such that the purified water flows into the raw water port 13 of the reverse osmosis membrane device 1, thereby the purified water flushes the interior of the reverse osmosis membrane device 1 to flush away and discharge the waste water remained at the waste water side of the reverse osmosis membrane in the reverse osmosis membrane device 1, so that the total dissolved solid (TDS) of a first cup of purified water that flows out of the water purifier at the beginning of use is effectively reduced.

In this embodiment, the first chamber 21 of the water storage device 2 can also be provided with filtering material. In a feasible embodiment, the filtering material can separate the first chamber 21 into a third chamber 211 and a fourth chamber 212 that are arranged along a filtering direction of the filtering material, wherein the third chamber 211 is communicated with the purified water port 11 of the reverse osmosis membrane device 1, and the fourth chamber 212 is communicated with the raw water port 13 of the reverse osmosis membrane device 1. In the water production mode of the water purifier, the third chamber 211 is communicated with the purified water port 11, and the fourth chamber 212 is disconnected from the raw water port 13. The purified water flowing out of the purified water port 11 flows into the third chamber 211 of the water storage device 2, is filtered by the filtering material, and then flows into the fourth chamber 212 to be stored. In the cleaning mode of the water purifier, under the action of the airbag, the purified water in the fourth chamber 212 is discharged and flows into the raw water port 13 of the reverse osmosis membrane device 1, so as to flush the reverse osmosis membrane device 1, and the purified water after the flushing is discharged from the waste water port 12 of the reverse osmosis membrane device 1. In addition, the fourth chamber 212 can be communicated with the water use end 10, and when the user needs to use water, he can directly obtain the purified water discharged from the fourth chamber 212. Especially when the filtering material is an activated carbon filter element 9, it can effectively absorbs peculiar smell in the purified water discharged from the purified water port 11 of the reverse osmosis membrane device 1, and thus can better improve user experience.

In any of the above embodiments, the waste water port 12 of the reverse osmosis membrane device 1 can be connected with a wastewater ratio means 4. The wastewater ratio means 4 is used for controlling pressure of the waste water port 12 of the reverse osmosis membrane device 1, such that there is a reasonable pressure difference in the interior of the reverse osmosis membrane device 1 to ensure the filtering function of the reverse osmosis membrane device 1, which meanwhile can adjust the pressure difference of the interior of the reverse osmosis membrane device 1, so as to control the volume flow rate of the fluid to be filtered by the reverse osmosis membrane device 1, i.e., the volume flow rate of the fluid to be filtered by the reverse osmosis membrane device 1 increases as the pressure difference increases. The wastewater ratio means 4 can be separately connected to the waste water port 12 of the reverse osmosis membrane device 1, or can be connected to the second solenoid valve 35 in parallel and then to the waste water port 12 of the reverse osmosis membrane device 1. When the water purifier is in the cleaning mode, the purified water discharged from the first chamber 21 flows into the raw water port 13 of the reverse osmosis membrane device 1. The purified water firstly flushes the reverse osmosis membrane device 1 and then is discharged from the waste water port 12 of the reverse osmosis membrane device 1 and then flows through the wastewater ratio means 4. While the purified water flows through the wastewater ratio means 4, it flushes the wastewater ratio means 4 as well, such that the original waste water in the wastewater ratio means 4 is flushed away. In the above manner, the water storage device stores the purified water to flush the reverse osmosis membrane device, which effectively improves the life of the reverse osmosis membrane of the reverse osmosis membrane device, meanwhile, the purified water that flows out of the waste water port of the reverse osmosis membrane device can flush the wastewater ratio means 4 of the water purifier, and improves the life of the wastewater ratio means as well.

The separator 23 of the water purifier in the embodiment of the present invention can be an airbag, a drumhead, or a piston, an elastic thin film or a flexible thin film, etc., the purified water stored in the water storage device is pushed by pressure of gas or pressure of tap water or elasticity thereof into the reverse osmosis membrane device to conduct the flushing. In this way, the water purifier can generate the pressure by which the purified water is pushed into the reverse osmosis membrane device 1 without the need of providing other pressure devices.

The present application further provides a water production method of a water purifier, in which the water purifier at least comprises: a reverse osmosis membrane device 1 comprising a raw water port 13, a purified water port 11 and a waste water port 12; a water storage device 2 which is provided therein with a first chamber 21 of which a volume can be adjusted, the first chamber 21 being communicated with the raw water port 13 and the purified water port 11, respectively.

The water production method of a water purifier specifically comprises the following steps: In the water production state of the water purifier, communicating the purified water port 11 with the first chamber 21, disconnecting the purified water port 11 from the first chamber 21 such that the purified water flowing out of the reverse osmosis membrane device 1 flows into the first chamber 21; In the cleaning state of the water purifier, communicating the raw water port 13 with the first chamber 21, such that the purified water in the first chamber 21 flows into the raw water port 13 of the reverse osmosis membrane device 1.

The embodiments herein are described in a progressive manner, and contents highlighted in each embodiment are difference from other embodiments, while the same or similar portions of the embodiments can refer to each other.

The above embodiments are merely for illustrating the technical concept and characteristics of the present invention, with the purpose that persons skilled in the art can acquire the content of the present invention and can accordingly implement it, but the protection scope of the present invention is not limited thereto. Any equivalent variations or modifications made according to the essential spirit of the present invention shall fall within the protection scope of the present invention.

Various features and advantages of the disclosure are set forth in the following claims.

What is claimed is:

1. A water purifier, wherein, the water purifier comprises:
a reverse osmosis membrane device comprising a raw water port, a purified water port and a waste water port, the water flowing from the purified water port is purified water;
a water storage device, an interior of the water storage device is provided with a first chamber of which a volume can be adjusted; the water storage device comprises a separator which separates the interior of the water storage device into the first chamber and a second chamber that are isolated from each other, and can adjust sizes of the first chamber and the second chamber;
the first chamber can be communicated with the raw water port and the purified water port, respectively, the second chamber can be communicated with a water source, the water source is tap water;
the water purifier has a cleaning mode and a water production mode,
in the cleaning mode, the first chamber is disconnected from the purified water port, the first chamber is communicated with the raw water port, the purified water flows from the first chamber into the raw water port of the reverse osmosis membrane device and is discharged from the waste water port of the reverse osmosis membrane device;
in the water production mode, the first chamber is communicated with the purified water port, and the first chamber is disconnected from the raw water port.

2. The water purifier according to claim 1, wherein, a first switching device is disposed between the first chamber and the raw water port, and a second switching device is disposed between the first chamber and the purified water port.

3. The water purifier according to claim 1, wherein, the water purifier further comprises a pre-filter element whose outlet can be in communication with the second chamber.

4. The water purifier according to claim 3, wherein, the water purifier comprises
a first control switch disposed between the outlet of the pre-filter element and the second chamber;
in the cleaning mode, the first control switch causes the outlet of the pre-filter element to be in communication with the second chamber;
in the water production mode, the first control switch causes the outlet of the pre-filter element to be disconnected from the second chamber.

5. The water purifier according to claim 1, wherein, the first chamber is provided therein with filtering material.

6. The water purifier according to claim 5, wherein, the filtering material separates the first chamber into a third chamber and a fourth chamber that are arranged along a filtering direction of the filtering material, the third chamber is communicated with the purified water port of the reverse osmosis membrane device, and the fourth chamber is communicated with the raw water port of the reverse osmosis membrane device.

7. The water purifier according to claim 6, wherein, the fourth chamber is communicated with a water use end.

8. The water purifier according to claim 5, wherein, the filtering material is activated carbon filter element.

9. The water purifier according to claim 1, wherein, the separator includes at least one of an airbag piston and a drumhead.

10. The water purifier according to claim 1, wherein, the separator comprises an elastic member that can adjust the volume of the first chamber.

11. A water production method of a water purifier, wherein, the water purifier comprises:
a reverse osmosis membrane device comprising a raw water port, a purified water port and a waste water port;
a water storage device which is provided therein with a first chamber of which a volume can be adjusted, the water storage device comprises a separator which separates the interior of the water storage device into the first chamber and a second chamber that are isolated from each other, and can adjust sizes of the first chamber and the second chamber;
the first chamber being communicated with the raw water port and the purified water port, respectively, the second chamber can be communicated with a water source, the water source is tap water;
when the water purifier is in a water production state, communicating the purified water port with the first chamber and disconnecting the raw water port from the first chamber such that purified water flowing out of the reverse osmosis membrane device flows into the first chamber;
when the water purifier is in a cleaning state, communicating the raw water port with the first chamber such that the purified water in the first chamber flows into the raw water port of the reverse osmosis membrane device.

12. A water purifier, wherein, the water purifier comprises:
a reverse osmosis membrane apparatus having a raw water port, a purified water port and a waste water port;
a water storage apparatus which is provided therein with a first chamber having a volume regulatable; the first chamber can be communicated with the raw water port and the purified water port; the water storage apparatus has an isolator which partitions an interior of the water storage apparatus into the first chamber and a second chamber that are isolated from each other, and the second chamber can be communicated with a water source; the water source supplies tap water; and the isolator can regulate sizes of the first chamber and the second chamber.

13. The water purifier according to claim 12, wherein the raw water port is connected with a booster pump and a front filter element; the waste water port of the reverse osmosis membrane apparatus is connected with a waste water ratio apparatus; and the purified water port is connected with an activated carbon filter element.

14. The water purifier according to claim 13, wherein the front filter element is connected at an upstream of the booster pump; and an outlet of the front filter element can be communicated with the second chamber.

15. The water purifier according to claim 12, wherein a first switching apparatus is provided between the first chamber and the raw water port.

16. The water purifier according to claim 14, wherein a first control switch is provided between the second chamber and the water source, and located between the outlet of the front filter element and the second chamber.

17. The water purifier according to claim 13, wherein a first electromagnetic valve is further provided between the front filter element and the booster pump.

18. The water purifier according to claim 15, wherein a second switching apparatus is provided between the first chamber and the purified water port.

19. The water purifier according to claim 12, wherein the first chamber is provided therein with a filtering material.

20. The water purifier according to claim 19, wherein the filtering material partitions the first chamber into a third chamber and a fourth chamber which are arranged along a filtering direction of the filtering material, wherein the third chamber is in communication with the purified water port of the reverse osmosis membrane apparatus, and the fourth chamber is in communication with the raw water port of the reverse osmosis membrane apparatus.

21. The water purifier according to claim 20, wherein the fourth chamber is in communication with a water use end.

22. The water purifier according to claim 12, wherein the isolator at least includes one of an airbag piston and a drum membrane.

23. The water purifier according to claim 12, wherein the water storage apparatus has an elastic member which can regulate the volume of the first chamber.

* * * * *